United States Patent [19]

Mullenberg

[11] 4,348,132

[45] Sep. 7, 1982

[54] CLAMPING CONNECTION FOR JOINING AN EXTERNAL STRUCTURAL PART WITH A SHAFT

[76] Inventor: Ralph Mullenberg, Im Wiesengrund 6, 4048 Grevenbroich 12, Fed. Rep. of Germany

[21] Appl. No.: 171,485

[22] Filed: Jul. 23, 1980

[30] Foreign Application Priority Data

Jul. 26, 1979 [DE] Fed. Rep. of Germany ....... 2930245

[51] Int. Cl.³ .................... B25G 3/28; F16B 3/00; F16B 7/00
[52] U.S. Cl. .................................. 403/356; 403/371
[58] Field of Search .............. 403/356, 357, 369, 370, 403/371

[56] References Cited

U.S. PATENT DOCUMENTS

| | | | |
|---|---|---|---|
| 2,570,604 | 10/1951 | Siegerist | 403/371 X |
| 2,639,621 | 5/1953 | Harris et al. | 403/371 X |
| 2,856,211 | 10/1958 | Firth | 403/357 |
| 3,957,381 | 5/1976 | Schäfer | 403/369 X |
| 4,068,965 | 1/1978 | Lichti | 403/356 X |

FOREIGN PATENT DOCUMENTS 329849  6/1958  Switzerland ........................ 403/371

*Primary Examiner*—W. L. Shedd
*Attorney, Agent, or Firm*—Schwartz, Jeffery, Schwaab, Mack, Blumenthal & Koch

[57] ABSTRACT

A clamping connection clampingly joins an external structural part, such as a gear, with a shaft. The connection includes a conical clamping set having a plurality of interengaging conical rings for generating radial clamping forces. The connection includes a longitudinally slit element which directly engages the shaft and a key which enters the longitudinal slit of such element in a region of the element which is at or near the conical clamping set. The key and the longitudinal slit are so dimensioned that the flanks of the longitudinal slit abut the key prior to complete tightening of the clamping set.

5 Claims, 4 Drawing Figures

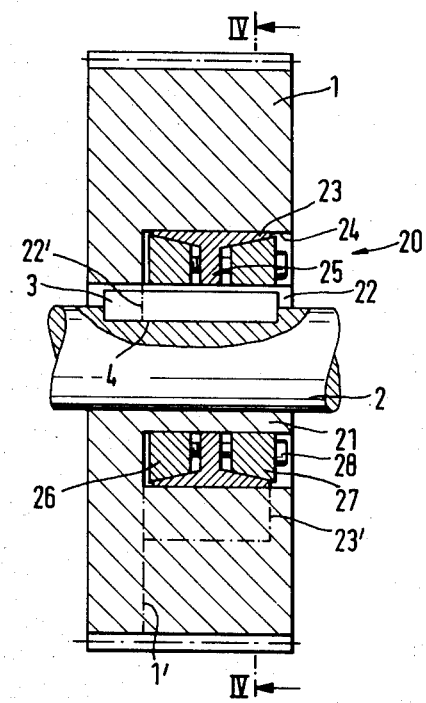
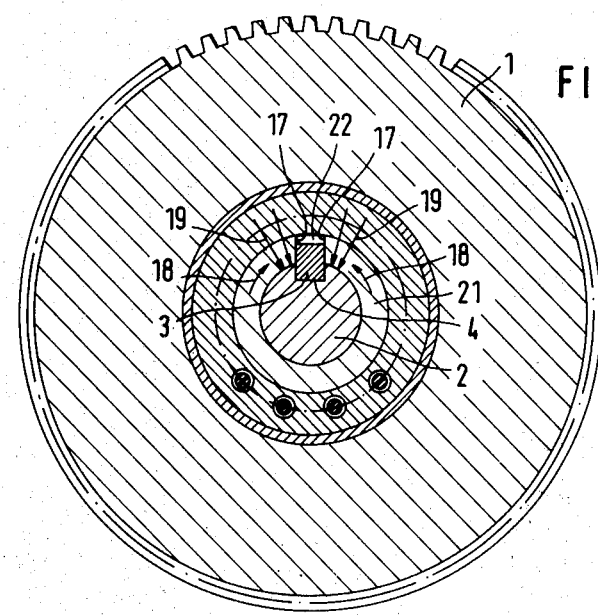

CLAMPING CONNECTION FOR JOINING AN EXTERNAL STRUCTURAL PART WITH A SHAFT

TECHNICAL FIELD OF THE DISCLOSURE

The invention concerns a clamping connection of the type in which an external structural part is clampingly joined with a shaft. In the type of clamping connection to which the invention relates, there is a conical clamping set including a plurality of co-operating conical rings. There is also a key interposed between the shaft and other elements of the connection to contribute to prevention of relative rotation between the shaft and the external structural part.

DESCRIPTION OF THE PRIOR ART

Clamping connections, wherein both a conical clamping arrangement and a key are used, are known in themselves. However, in the known forms of embodiment, the two devices act entirely independently of each other. Therefore, when high alternating stresses act in the circumferential direction and the holding power of the conical clamping arrangement is exceeded, the key comes into play and is stressed in a direction entirely normal to its length. The key is then in danger of being deflected by the alternating stress, because it has the usual initial clearance.

An example of this type of connection is represented in U.S. Pat. No. 2,482,662 showing the mounting of a pulley having a hub with a conical bore. A conical ring is in the conical bore. The ring is arranged with its cylindrical internal bore on the shaft. The conical ring is slit. A conventional key is provided on the side opposite to the slit. The key enters both the conical ring and the shaft.

Another known example is found in French Pat. No. 678,406, which again shows a clamped connection with a conical ring and a key associated with it, but here the key acts outside the conical ring.

SUMMARY

It is the object of the invention to provide a clamped connection of the present type whereby the safety of the connection is increased under alternating torque stresses.

The solution of the problem of attaining this object is found in the clamping connection of the present invention. This connection includes a conical clamping set surrounding the shaft and engageable with the external structural part which is to be joined with the shaft. The conical clamping set includes a plurality of co-operating conical rings for generating, under the action of a tightening operation, radial clamping forces upon axial displacement of at least one conical ring relative to another. The clamping connection also includes an element which directly engages the shaft. This element has a slit which extends both radially and longitudinally therein. The slit is defined by flanks in the element. The element receives radial clamping forces imparted by the clamping set. There is a certain region in which the longitudinal slit and part of the clamping set are closely mutually disposed. A key co-operates with the shaft and enters the longitudinal slit in at least the certain region thereof. The clamping connection includes means for effecting forcible abutment of the longitudinal slit, via its flanks, against the key under the action of the radial forces imparted by the clamping set prior to complete tightening of the clamping set. This abutment affecting means includes the mutual dimensioning of the longitudinal slit and the key to effect the above-described forcible abutment prior to tightening.

By arranging the key and the conical clamping device at the same height in the axial view, the key is placed within the range of the radial compression exerted by the conical device. Furthermore, since the key is located in the longitudinal slit of the element directly placed on the shaft, the tightening of the conical clamping device applies pressure to the key in the circumferential direction and additionally applies a certain pressure on the shaft in the radial direction, in the areas immediately adjacent to the keyway. Dimensions should be such that contact of the key with the flanks of the longitudinal slit occurs prior to the exhaustion of the stressing force of the bolts. Further tightening results in a compressive stress on the part of the key projecting from the shaft in the circumferential direction. The part of the key seated in the shaft is equally clamped tight by means of the forces acting radially next to it, and by the resultant deformation of the edges of the keyway. In the case of a fully tightened conical clamping arrangement, the shaft, the key and the element in direct contact with the shaft and containing the longitudinal slit, form a single unit under stress and without clearance, whereby the danger or deflection, which is otherwise present, is substantially reduced.

The enhancement of safety achieved by the present clamping connection under an alternating stress makes it possible to use shafts that are thinner than those required to accomodate the necessarily large key cross sections of prior connections. Conversely, higher torques may be transmitted with identical shaft diameters. The invention therefore significantly increases the economy of clamped connections of this type.

The invention, of course, may be embodied in more than one form. In one form of embodiment, the element which directly engages the shaft may be constituted by a longitudinally slit conical ring which is part of the conical clamping set. This ring, of course, contains the longitudinal slit which is entered by the key.

In another form of embodiment, the element which directly engages the shaft is constituted by a longitudinally slit hub of the external structural part to be clamped to the shaft. In this case, the conical clamping set is disposed radially outside the longitudinally slit hub. This hub, of course, contains the longitudinal slit which is entered by the key.

BRIEF DESCRIPTION OF THE DRAWING

The drawing illustrates exemplary embodiments of the invention:

FIGS. 3 and 4 show corresponding views of another form of embodiment.

DETAILED DESCRIPTION

Figure 1:
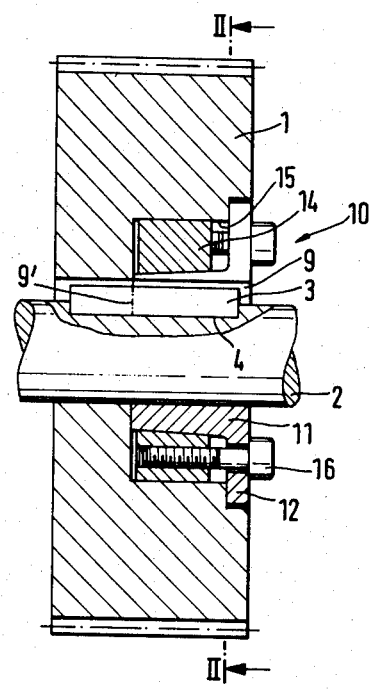
FIG. 1 shows a longitudinal cross section through a first form of embodiment of a clamping connection according to the present invention.
Figure 2:
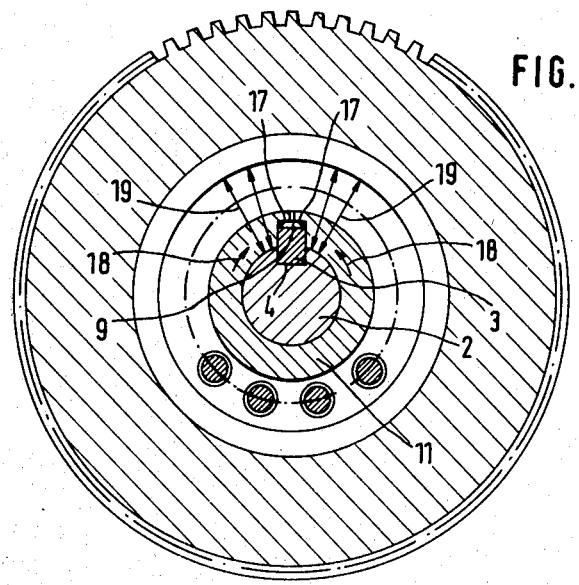
FIG. 2 shows a cross section on the line II—II in FIG. 1.

The embodiment of FIGS. 1 and 2 includes a clamping set forming the conical clamping device, whereby a gear 1 is secured to a shaft 2. The clamping set 10 is aided by a key 3 seated in a keyway 4 of the shaft.

The clamping set 10 includes an element arranged directly on the shaft, i.e. a conical ring 11, in contact, by means of its cylindrical inner circumferential surface, with the outer circumference of the shaft 2. Conical ring 11 has a radial flange 12 on its end to the right as viewed in FIG. 1. The conical ring 11 is slit at one location by means of a radial saw cut. At this location conical ring 11 also has, in its area facing the shaft, a continuous longitudinal slit 9 corresponding to its width to the width of the key 3 which is arranged in the slit. It will be apparent that the part of the slit which is disposed radially outwardly of the part 9, which corresponds in width to the key, has a smaller width than that of the key.

A further conical ring 14 is seated on the radially outward conical circumferential surface of the conical ring 11. Ring 14 abuttingly engages with its external cylindrical circumference a corresponding recess 15 of the gear 1. The conical rings 11, 14 are drawn axially against each other by means of drawbolts 16, which penetrate through passages in the radial flange 12 and engage threaded bores of the conical ring 14. This, of course, generates a radial pressure force.

The keyway 4 in the shaft is dimensioned so that even initially the key fits in it as tightly as possible. The longitudinal slit 9 is dimensioned so that its flanks 17 contact the sides of the part of the key projecting from the shaft prior to the exhaustion of the stressing force of the bolts. Upon the further tightening of the bolts 16, the flanks 17 of the longitudinal slit 9 are urged under pressure against the sides of the key 3 in the direction of the arrows 18. Simultaneously, the radial pressure force applies pressure on the shaft in the direction of the arrows 19 in the area adjacent to the keyway 4. This pressure acts to displace the edges of the keyway inwardly against the sides of the key 3. In this manner, all three parts 2, 3, and 11 are clamped together into a single unit without clearance.

As in known devices, the torque to be transmitted acts on the external circumference of the conical ring 14 by means of a purely frictional contact. However, at the external circumference of the present device—by virtue of its greater distance from the axis—the manner of effecting coupling is not as critical, because the circumferential forces are lower and more readily controlled.

In the embodiment according to FIGS. 3 and 4, the gear 1 is secured to the shaft 2 by means of the clamping set 20 and the key 3. However, the element arranged directly on the shaft is no longer a part of the clamping set. Rather, it is a kind of hub 21 of the gear 1, pressed from the outside by means of the clamping set 20 radially inwardly into the shaft 2. In this case, the hub 21 has a longitudinal slit 22 wherein the key 3 is seated. The requirements concerning the dimensions of the width of the slit 22 in relation to the key 3 and the resulting condition upon tightening are similar to those in the form of embodiment of FIGS. 1 and 2.

The clamping set 20 comprises a double conical ring 23, resting with its cylindrical outer surface in a recess 24 of the gear 1. The double conical ring 23 has an inner circumferential ledge 25, seated centrally on the outside circumference of the hub 21. The inwardly directed, opposingly inclined conical surfaces of the double conical ring 23 co-operate with two conical rings 26, 27, which contact, via their cylindrical inner circumferences, the outer circumference of the hub 21. Rings 26, 27 may be tightened against each other by means of a drawbolts 28, whereby the clamping set 20 is radially expanded and the hub 21 is compressed, while being supported against the circumference of the recess 24 on the shaft 2.

In addition to use with the type of gear shown in solid lines in FIG. 3, wherein the gear 1 has a recess 24 to support the clamping set 24, this form of embodiment is also applicable to a hub projecting from a narrower gear 1 as shown in phantom lines in the lower half of FIG. 3. Here, the outer conical ring 23' of the clamping set 20 will have a thick wall and no slit as shown in FIG. 3 by the phantom lines. Thus, it is capable of absorbing the necessary stressing force or circular stress, respectively.

The longitudinal slits 9, 22 of the elements 11, 21 arranged directly on the shaft 2 extend, in the forms of embodiment shown, into the gear itself. The key 3 also penetrates into the gear, but there it is no longer affected by the action of the clamping set 10, 20 according to the invention. It should be understood that the slits in the gears may be eliminated and the keys 3 may be made shorter, as indicated by the phantom lines 9' and 22' in FIGS. 1 and 3.

What is claimed is:

1. A clamping connection for joining an external structural part with a shaft, which shaft includes a longitudinal keyway therein defined by flanks in the shaft, the connection comprising:
    a conical clamping set surrounding said shaft and being engageable with the external structural part, said conical clamping set including a plurality of co-operating conical rings for generating, under the action of a tightening operation, radial clamping forces upon axial displacement of at least one conical ring in relation to another;
    an element which directly engages the shaft, said shaft engaging element having a slit which extends both radially and longitudinally therein, said slit being at least partially defined by flanks in said shaft engaging element, said shaft engaging element receiving radial forces generated by the clamping set, there being a certain region in which said longitudinal slit and part of said clamping set are closely mutually disposed;
    a key fitted into said longitudinal keyway in the shaft and tightly abutting the flanks in the shaft prior to tightening of the conical ring, said key entering said longitudinal slit in at least said certain region thereof;
    said longitudinal slit in said shaft engaging element and said key being mutually so dimensioned as to effect forcible abutment of said longitudinal slit, via its flanks, against said key prior to complete tightening of said clamping set, yet after initiation of tightening thereof and to effect further tightening of the abutment of the flanks of the keyway with said key during tightening of said conical clamping set, such further tightening being effected by a radially inward force exerted by said shaft engaging element on the shaft in the region of the keyway thereof during tightening of the clamping set.

2. A clamping connection as defined in claim 1 wherein said shaft engaging element is constituted by a longitudinally slit conical ring directly engaging the shaft, said longitudinally slit conical ring being part of said conical clamping set, said longitudinal slit which is entered by said key being disposed in said longitudinally slit ring.

3. A clamping connection as defined in claim 1 wherein said shaft engaging element is constituted by a longitudinally slit hub of the external structural part, said conical clamping set being disposed radially outside said longitudinally slit hub, said longitudinal slit which is entered by said key being disposed in said longitudinally slit hub.

4. A clamping connection for joining an external structural part with a shaft, the connection comprising:

a conical clamping set surrounding said shaft and being engageable with the external structural part, said conical clamping set including a plurality of co-operating conical rings for generating, under the action of a tightening operation, radial clamping forces upon axial displacement of at least one conical ring in relation to another;

an element which directly engages the shaft, said shaft engaging element having a slit which extends both radially and longitudinally therein, said slit extending entirely through said shaft engaging element in the radial direction, said slit being at least partially defined by flanks in said shaft engaging element, said shaft engaging element receiving radial forces generated by the clamping set, there being a certain region in which said longitudinal slit and part of said clamping set are closely mutually disposed;

a key cooperating with said shaft and entering said longitudinal slit in at least said certain region thereof;

means for effecting forcible abutment of said longitudinal slit, via its flanks, against said key prior to complete tightening of said clamping set yet after initiation of tightening thereof, said abutment effecting means including the mutual dimensioning of said longitudinal slit and said key to effect said forcible abutment prior to complete tightening.

5. A clamping connection as defined in claim 4, wherein said slit in said shaft engaging element has a first part which has a width suitable for receiving said key and a second part which has a width smaller than that of said first part, said first part of said slit being defined by said flanks in said shaft engaging element, said second part of said slit being disposed radially outwardly of said first part.

* * * * *